United States Patent
Bos et al.

(10) Patent No.: US 12,047,491 B2
(45) Date of Patent: Jul. 23, 2024

(54) SPEEDING UP HASH-CHAIN COMPUTATIONS

(71) Applicant: NXP B.V., Eindhoven (NL)

(72) Inventors: Joppe Willem Bos, Wijgmaal (BE); Mario Lamberger, Graz (AT); Joost Roland Renes, Eindhoven (NL); Tobias Schneider, Graz (AT); Christine van Vredendaal, Veldhoven (NL)

(73) Assignee: NXP B.V., Eindhoven (NL)

( * ) Notice: Subject to any disclaimer, the term of this patent is extended or adjusted under 35 U.S.C. 154(b) by 503 days.

(21) Appl. No.: 17/243,058

(22) Filed: Apr. 28, 2021

(65) Prior Publication Data

US 2022/0376892 A1 Nov. 24, 2022

(51) Int. Cl.
*H04L 9/06* (2006.01)
*H04L 9/32* (2006.01)
*H04L 9/00* (2022.01)

(52) U.S. Cl.
CPC .......... *H04L 9/0643* (2013.01); *H04L 9/3236* (2013.01); *H04L 9/50* (2022.05)

(58) Field of Classification Search
CPC ........ H04L 9/0643; H04L 9/3236; H04L 9/50
See application file for complete search history.

(56) References Cited

U.S. PATENT DOCUMENTS

| | | | |
|---|---|---|---|
| 7,894,440 B2 * | 2/2011 | Xu | H04L 45/00 370/392 |
| 8,538,014 B2 | 9/2013 | Perlman | |
| 8,856,547 B2 | 10/2014 | Gueron et al. | |
| 8,990,905 B1 | 3/2015 | Bailey et al. | |
| 9,071,843 B2 | 6/2015 | Abdo et al. | |
| 9,374,373 B1 * | 6/2016 | Chan | H04L 9/3247 |
| 9,747,458 B2 | 8/2017 | Jakobsson | |
| 10,938,567 B2 * | 3/2021 | Martino | G06Q 20/065 |
| 11,206,136 B1 | 12/2021 | Renes et al. | |
| 11,303,429 B2 * | 4/2022 | Ghosh | G06F 7/503 |
| 2005/0229254 A1 * | 10/2005 | Singh | H04L 63/1416 726/23 |
| 2010/0232434 A1 * | 9/2010 | Xu | H04L 45/00 370/392 |
| 2016/0112200 A1 * | 4/2016 | Kheterpal | H04L 9/0643 380/28 |
| 2017/0102946 A1 * | 4/2017 | Truta | G09C 1/00 |

(Continued)

OTHER PUBLICATIONS

Kaminsky et al., A Case for a Parallelizable Hash, 7 pages, 2008, IEEE (Year: 2008).*

(Continued)

*Primary Examiner* — Oleg Korsak

(57) ABSTRACT

Various embodiments relate to a hardware device configured to compute a plurality of chained hash functions in parallel, including: a processor implementing p hash functions configured to operate on a small input, where p is an integer; a data unit connected to the plurality of hash functions, configured to store the outputs of plurality of hash functions that are then used as the input to a next round of computing the hash function, wherein the processor receives a single instruction and p small data inputs, and wherein each of the p hash functions are used to perform a chained hash function operation on a respective small input of the p small inputs.

16 Claims, 2 Drawing Sheets

(56) References Cited

U.S. PATENT DOCUMENTS

| 2017/0109096 | A1* | 4/2017 | Jean | G06F 3/0679 |
|---|---|---|---|---|
| 2019/0081793 | A1* | 3/2019 | Martino | H04L 9/0894 |
| 2019/0319782 | A1* | 10/2019 | Ghosh | G06F 7/503 |
| 2019/0319799 | A1 | 10/2019 | Suresh et al. | |
| 2019/0319802 | A1 | 10/2019 | Misoczki et al. | |
| 2020/0341900 | A1* | 10/2020 | Sandberg | G06F 12/0864 |

OTHER PUBLICATIONS

Wen Wang, et al., "XMSS and Embedded Systems XMSS Hardware Accelerators for RISC-V," received Dec. 21, 2018, last revised Mar. 8, 2020; Yale University, New Haven, CT; 28 pgs; https://link.springer.com/chapter/10.1007%2F978-3-030-38471-5_21.

Vinay B. Y. Kumar et al., "Post-Quantum Secure Boot," Design, Automation and Test in Europe (Date 2020); Downloaded on Apr. 30, 2021 at 17:42:39 UTC from IEEE Xplore, pp. 1582-1585; https://ieeexplore.ieee.org/document/9116252.

Andreas Hulsing, W-OTS+—Shorter Signatures for Hash-Based Signature Schemes, Progress in Cryptology—AFRICACRYPT 2013 (Amr Youssef, Abderrahmane Nitaj, and Aboul-Ella Hassanien, eds.), vol. 7918, 2013, pp. 173-188.

Andreas Hülsing, et al., XMSS: Extended Hash-Based Signatures. RFC 8391, 2018.

Andreas Hülsing, et al., Mitigating Multi-target Attacks in Hash-Based Signatures, PKC 2016 (Chen-Mou Cheng, Kai-Min Chung, Guiseppe Persiano, and Bo-Yin Yang, eds.), vol. 9614, 2016, pp. 387-416.

Ralph C. Merkle, A Certified Digital Signature, Advances in Cryptology—CRYPTO (Gilles Brassard, ed.), vol. 435, Springer, 1989, pp. 218-238.

* cited by examiner

SPEEDING UP HASH-CHAIN COMPUTATIONS

TECHNICAL FIELD

Various exemplary embodiments disclosed herein relate generally to a processor and method for speeding up hash-chain computations.

BACKGROUND

Digital signatures are of vital importance to our cryptographic infrastructure. For example, they underpin the authentication infrastructure in the form of digital certificates on the internet, which is shifting more and more to resource-constrained devices in the Internet of Things (IoT). In order to make digital signatures accessible to such small devices, it is important to minimize the resource requirements and optimize the efficiency of the involved algorithms (e.g., key generation, signing, and verification).

SUMMARY

A summary of various exemplary embodiments is presented below. Some simplifications and omissions may be made in the following summary, which is intended to highlight and introduce some aspects of the various exemplary embodiments, but not to limit the scope of the invention. Detailed descriptions of an exemplary embodiment adequate to allow those of ordinary skill in the art to make and use the inventive concepts will follow in later sections.

A hardware device configured to compute a plurality of chained hash functions in parallel, including: a processor implementing p hash functions configured to operate on a small input, where p is an integer; a data unit connected to the plurality of hash functions, configured to store the outputs of plurality of hash functions that are then used as the input to a next round of computing the hash function, wherein the processor receives a single instruction and p small data inputs, and wherein each of the p hash functions are used to perform a chained hash function operation on a respective small input of the p small inputs.

Various embodiments are described, wherein the small input has a size of less than or equal to four times the block size of the hash functions.

Various embodiments are described, wherein the small input has a size of less than or equal to two times the block size of the hash functions.

Various embodiments are described, wherein the small input has a size of less than or equal to the block size of the hash functions.

Various embodiments are described, wherein the processor implementing p hash functions is optimized to process the small input.

Various embodiments are described, wherein the hardware device is an integrated circuit.

Various embodiments are described, wherein the processor implementing p hash functions is a crypto processor.

Various embodiments are described, wherein the data unit includes a plurality of data units, wherein each of the plurality of data units is associated with one or more of the p hash functions.

Various embodiments are described, wherein the data unit includes a plurality of p data units, wherein each of the plurality of data units is associated with one of the p hash functions.

Further various embodiments relate to a method of computing a plurality of chained hash functions in parallel, including: receiving a single instruction and a plurality of small data inputs, wherein the single instruction instructs a processor to perform a parallel chained hash operation on the plurality of small data inputs; for each of the small data inputs in parallel computing a chained hash function on the small data inputs, wherein in the chained has function includes a plurality of rounds: applying the hash functions to each of the small data inputs in a first round to produce an output; and applying the hash functions to the output of a previous round in the second to last round.

Various embodiments are described, wherein computing the chained hash function on the data inputs further includes: updating a counter; outputting the hash of the input using the hash function when the counter is within the counter limit; and outputting the input to the hash function when the counter is outside the counter limit.

Various embodiments are described, wherein computing the chained hash function includes performing m chained hash operations on the data inputs further includes: determining a split of m into sub-counters that are a power of 2, determining which of the m sub-counters hash operations should be performed repeating for all sub-counters performing $2^{sub-counter}$ chained hash operations on the data inputs outputting the of the data inputs.

Various embodiments are described, wherein the small input has a size of less than or equal to four times the block size of the hash functions.

Various embodiments are described, wherein the small input has a size of less than or equal to two times the block size of the hash functions.

Various embodiments are described, wherein the small input has a size of less than or equal to the block size of the hash functions.

Various embodiments are described, wherein the hash functions are optimized to process the small input.

Various embodiments are described, wherein computing a chained hash function on the small data inputs further comprises writing the small data inputs into a dedicated data unit associated with processor, applying the hash functions to each of the small data inputs in a first round to produce an output further comprising reading the small data from a data unit in the processor and writing the output to the data unit, and applying the hash functions to the output of a previous round in the second to last round further comprising reading the output from the previous round and writing the output to the data unit.

BRIEF DESCRIPTION OF THE DRAWINGS

In order to better understand various exemplary embodiments, reference is made to the accompanying drawings, wherein.

To facilitate understanding, identical reference numerals have been used to designate elements having substantially the same or similar structure and/or substantially the same or similar function.

DETAILED DESCRIPTION

Figure 1:
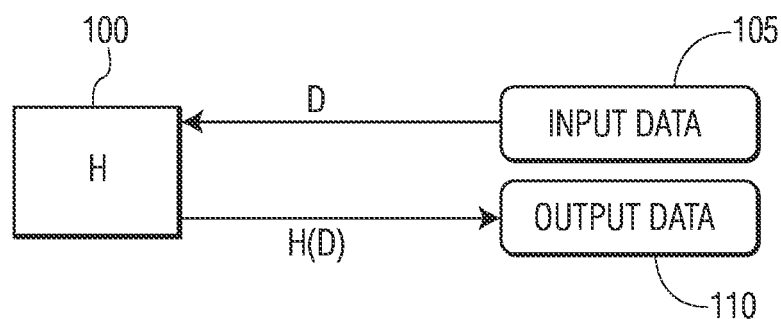
FIG. 1 illustrates the standard operation of a hash function.

The description and drawings illustrate the principles of the invention. It will thus be appreciated that those skilled in the art will be able to devise various arrangements that, although not explicitly described or shown herein, embody the principles of the invention and are included within its scope. Furthermore, all examples recited herein are principally intended expressly to be for pedagogical purposes to aid the reader in understanding the principles of the invention and the concepts contributed by the inventor(s) to furthering the art and are to be construed as being without limitation to such specifically recited examples and conditions. Additionally, the term, "or," as used herein, refers to a non-exclusive or (i.e., and/or), unless otherwise indicated (e.g., "or else" or "or in the alternative"). Also, the various embodiments described herein are not necessarily mutually exclusive, as some embodiments can be combined with one or more other embodiments to form new embodiments.

Digital signatures are of vital importance to our cryptographic infrastructure. New standards related to post-quantum secure digital signatures are in the making, one of which relates to hash-based signatures. Embodiments will be described herein that show how to speed-up the computation of the cryptographic hashes for embedded devices using additional hardware exploiting the small input size, the independent subsets of hash computations, and the chaining properties inside these subsets.

The most commonly used signature schemes are RSA and variants of (EC)DSA. However, with the possibility of a quantum computer being realized, the security of RSA and (EC)DSA is threatened. The idea of hash-based signatures dates back to a proposal by Ralph Merkle from the late 1970's (see Ralph C. Merkle, *A Certified Digital Signature*, Advances in Cryptology—CRYPTO (Gilles Brassard, ed.), vol. 435, Springer, 1989, pp. 218-238.). Hash-based signatures rely on a graph structure in which nodes correspond to public keys of One-Time Signature (OTS) schemes, which are in turn constructed using hash functions. The security of this approach therefore relies on the cryptographic strength of the used hash function and the pseudo-random function family: cryptographic primitives which are well-studied, understood, and not known to be broken by quantum computers.

XMSS has matured since its original publication (see Andreas Hülsing, Joost Rijneveld, and Fang Song, *Mitigating Multi-target Attacks in Hash-Based Signatures*, PKC 2016 (Chen-Mou Cheng, Kai-Min Chung, Guiseppe Persiano, and Bo-Yin Yang, eds.), vol. 9614, 2016, pp. 387-416.), resulting in the scheme described in RFC 8391 (see Andreas Hülsing, Denise Butin, Stefan-Lukas Gazdag, Joost Rijneveld, and Aziz Mohaisen, *XMSS: Extended Hash-Based Signatures*. RFC 8391, 2018). RFC 3291 uses WOTS$^+$ as OTS, which are described herein in the context of XMSS (see Andreas Hülsing, *W-OTS+—Shorter Signatures for Hash-Based Signature Schemes*, Progress in Cryptology—AFRICACRYPT 2013 (Amr Youssef, Abderrahmane Nitaj, and Aboul-Ella Hassanien, eds.), vol. 7918, 2013, pp. 173-188). The security parameter n determines the message digest length m, and n influences the size of private key, public key, and signature. The Winternitz parameter w may be used to control a trade-off between speed and signature size. A greater value of w implies a smaller signature, but slower speeds and vice versa. Typically w is chosen as a power of 2 within {4,16,256}, as this allows for easy transformation of bit strings into base-w encoded strings. Further define:

$$\ell_1 = \lceil m/\log_2(w) \rceil, \ell_2 = \lfloor \log_2(\ell_1(w-1)/\log_2(w)) \rfloor + 1$$
$$\text{and } \ell = \ell_1 = \ell_2.$$

An uncompressed WOTS$^+$ private key, public key, and signature includes $\ell$ blocks of n bits each.

An m-bit message digest of a message M, $H_M$ may be re-written to its base-w representation. The result is a length $\ell_1$ vector of integers $h_i \in [0, w-1]$. Each of these integers defines a chain length in the message (hash) chains. The checksum of $H_M$ is defined as $C_M = \Sum_{i=1}^{\ell_1}(w-1-h_i)$, which may be represented as a length $\ell_2$ vector of base-w values $C_M = (c_1, \ldots, c_{\ell_2})$, with $c_i \in [0, w-1]$. These hash chains may be called the checksum (hash) chains. This checksum is necessary to prevent message forgery because an increase in at least one $h_i$ leads to a decrease in at least one $c_i$ and vice-versa. Using these $\ell$ integers as chain lengths, the function $\mathcal{H}$ is applied to the private key elements. This leads to $\ell$ n-bit values that make up the signature. For a received message and signature, the verifier can recompute the checksum, derive the chain lengths, apply $\mathcal{H}$ iteratively to complete each chain to its full length w, and compute a candidate WOTS+ public key. This can then be compared to the n-bit public key.

It is noted that besides WOTS+, the embodiments described herein applies to any one-time signature scheme based on hash-chains (e.g., WOTS, HORST). Further, other stateful signature schemes that use WOTS+ may be used, e.g., XMSSAMT, LMS, and HSS. SPHINCS/SPHINCS+ are hash-based (non-stateful) schemes where the embodiments described herein may also be applied.

These (stateful) hash-based signature schemes inherently need to compute thousands of cryptographic hash computations per signature generation or verification. The iterative application of the hash function $\mathcal{H}$ is a dominating factor in the computation cost of a signature verification. These computations can be too slow for embedded devices. In the case of an embedded device, verifying a signature could thus be sped up by a dedicated hardware design for the computations of these hash chains. The embedded device that verifies a signature, may be used in any device that allows for any kind of remote access, control, or configuration. For example, various smart devices are being uses in various home, office, and industrial applications that would benefit from such an embedded device. The embodiments described herein present such a design.

Some hash-based signature schemes (e.g., stateful schemes) inherently need to compute thousands of cryptographic hash computations per signature generation or verification. A significant part of these hash computations may be on small inputs (e.g., 96 bytes) and are chained: i.e., the output of the hash function is used as the input to a subsequent iteration. Embodiments are described herein that demonstrate an efficient technique to compute these hashes using specific techniques and a hardware extension.

The main computational operation in stateful hash-based signature schemes is computing the cryptographic hash function. Examples include the standardized SHA-256 or SHA-3 algorithms. Typically, these hash computations are performed by calling the target hash function implemented in software on the input data and retrieving the output data from the software library. FIG. 1 illustrates the standard operation of a hash function. The hash function 100 receives input data D 105 and produces output data H(D) 110. The hash function 100 may be implemented in software on a processor. The processor may be a general purpose processor or a special purpose processor that is optimized to more efficiently compute the hash function 100. In other embodiments, the hash function 100 may be implemented in hardware in order to optimize the operation of the hash function.

In order to try and optimize these hash computations the following three properties may be observed. The first property is concurrent execution. The large number of hash computations may be divided into independent subsets that may be operated on independently. For example, in the XMSS signature verification one has a high-level structure which looks like:

for i=1 to d
   for j=1 to $\ell$
      for k=1 to m
         perform hash computation where the parameter d is the number of subtrees (d=1 for the regular XMSS) and $\ell$ as defined above. The d·$\ell$ =d·($\ell_1$+ $\ell_2$) computations are independent and could be executed concurrently. For example, a typical setting in practice is for w=16 with $\ell_1$=64 and $\ell_2$=3 such that m∈{0, . . . w−1}.

The second property is chained hashing. The m hash computations performed in the inner-loop are all chained. This means that the input of the (i+1)$^{th}$ iteration is the output of the i$^{th}$ iteration.

The third property is small inputs. The overwhelming majority of hash-computations performed is on small inputs where small means less than one to four times the block size of the hash function. For example, the inputs may be 96 bytes for one of the recommended parameter sets.

An initial step towards an optimization is to create dedicated hardware for these small inputs. Hence, hardware that may very efficiently process small inputs: e.g., the size of the input may be less than one or two or four times the block size of the target hash algorithm (512-bit for SHA-256 and 1088-bit for SHA3-256). The hash function takes the input message and breaks it up into blocks of data having the block size and processes each of the blocks in rounds to get the final output. Accordingly, if the input is small and known beforehand then this can greatly speed up the calculation of the hash function on an input. Further, as the hash function in this situation does not need to be able to deal with an input of an arbitrary length, the implementation of the hash function can further be optimized, especially if the input size is fixed.

Figure 2:
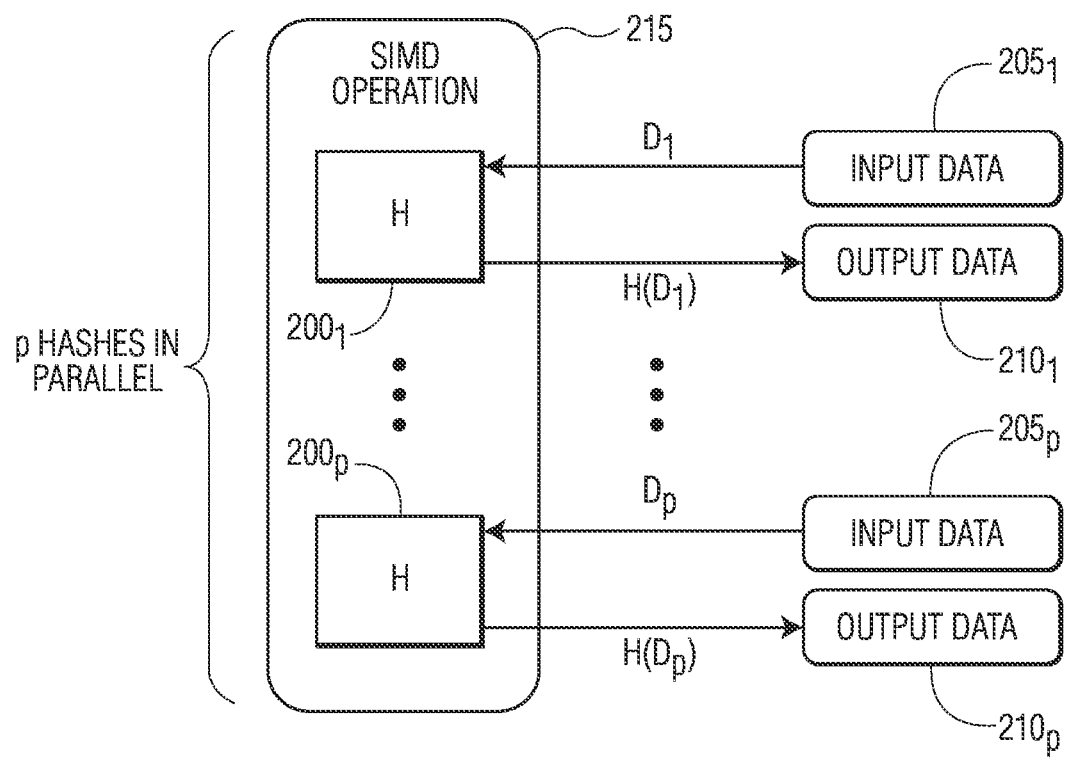
FIG. 2 illustrates a processor that implements an SIMD operation that performs the hash function in parallel on p inputs.

Using this specialized hardware one can create an instruction which operates following the single instruction, multiple data (SIMD) paradigm: i.e., providing p (different) inputs to the SIMD instruction computes the small-input hash computation on all of the inputs and returns the output. FIG. 2 illustrates a processor that implements an SIMD operation that performs the hash function in parallel on p inputs. Specifically, a plurality of inputs, on which the hash function needs to be performed, may be broken up into sets of p inputs. These p inputs are input into the processor 215 to carry out an SIMD instruction. The processor 215 implements p instances of the hash function 200$_1$ to 200$_p$. Each instance of the hash function 200 receives corresponding inputs $D_1$ to $D_p$ (205$_1$ to 205$_p$) and produces outputs $H(D_1)$ to $H(D_p)$ (210$_1$ to 210$_p$). This results in d·$\ell$ ·m calls to the hash function to be reduces to $\lceil$ d·$\ell$ ·m/p $\rceil$ calls to the hash function using SIMD operations, which allows for the calculation of the hashes to be completed more quickly.

Figure 3:
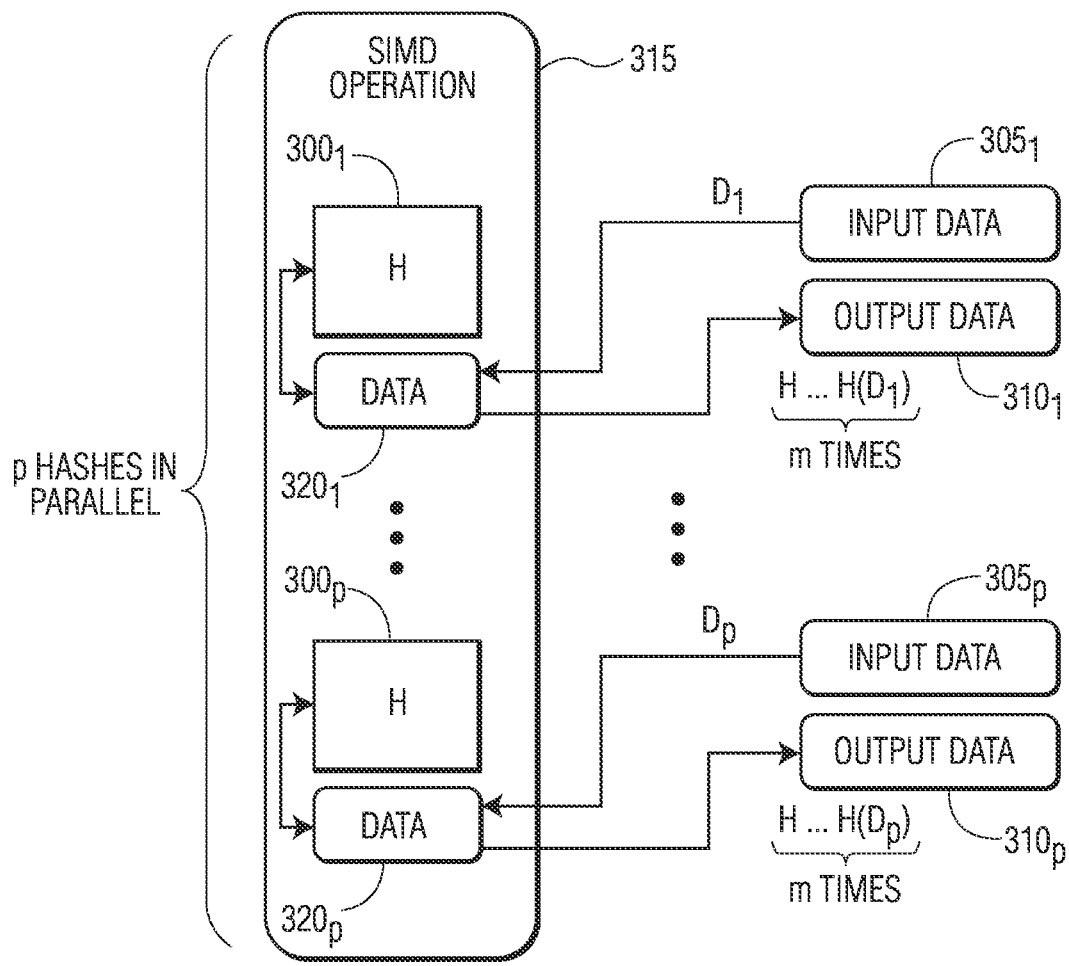
FIG. 3 illustrates a processor that implements an SIMD operation that performs the hash function in parallel on p inputs with data units to facilitate the calculation of m chained hashes.

A further idea is to exploit the fact that many computations are chained: hence, the input from one computation is the output of the other. By adding p small data units to the hardware computing the SIMD instruction enables the hardware implementing the hash function to compute using this data unit only which will greatly speed up the calculation of the chained hashes as the operation of receiving and outputting data results from the processor over a bus may be a slow operation. This allows fast access to the data that is processed and reduces memory latencies. FIG. 3 illustrates a processor that implements an SIMD operation that performs the hash function in parallel on p inputs with data units 320$_1$ to 320$_p$ to facilitate the calculation of chained hashes. The data units 320$_1$ to 320$_p$ are a dedicated data storage or memory on the processor 315. Specifically, a plurality of inputs, on which the hash function needs to be performed, may be broken up into sets of p inputs. These p inputs are input into the processor 315. The processor 315 implements p instances of the hash function 300$_1$ to 300$_p$. Further, the processor 315 includes p instances of a data unit 320$_1$ to 320$_p$ where each of the data units 320$_1$ to 320$_p$ are associated with one of the hash functions 300. In other embodiments, a single data unit 320 may serve all of the hash functions 300 or a plurality of data units 320 may be present where each of the data units 320 serve more than one hash function 300. Each instance of the hash function receives corresponding inputs $D_1$ to $D_p$ (305$_1$ to 305$_p$) and produces output H(H( . . . H($D_1$) . . . )) to H(H ( . . . H($D_p$) . . . )) (310$_1$ to 310$_p$). Before the chain of operations start the user loads the input data into the data unit(s) 320. The outputs are then retrieved from the data unit(s) 320 after the final computations in the chain.

This approach works great if all the p parallel computations need to perform the same number of m computations (the length of the chain). This is, unfortunately, unlikely in signature generation and verification. One cannot simply stop computing with one of the streams inside the SIMD computation as this violates the design principle of SIMD. A solution to this problem is to give each of the p data units a counter which states how many hash computations need to be performed in this chain by this stream in the SIMD unit. After each hash computation this counter is decreased by one. Based on the value of this counter the hardware selects the correct value to output, which ensures that all streams in the SIMD unit perform identical steps. Hence, the procedure may be implemented as follows:

Compute h=H(input)
Decrease counter by one $$\text{output} = \begin{cases} \text{input} & \text{if counter} \leq 0 \\ h & \text{otherwise} \end{cases}.$$

This may be implemented using straight-line code by using, for example, a simple masking technique.

Alternatively, the hash computations may be split up into $\log_2(w)$ SIMD operations. This alleviates the need for a counter, but might add some operations. This may be achieved as follows. Suppose again that w=16 (although the technique is generally applicable to other values of w). Let $m_0|m_1|m_2|m_3$ be the binary representation of m. Then 4 SIMD operations are performed, each performing b=$2^i$ hashes, but only input the data units for which $m_i$=1. After applying this to all data-units for i=0,1,2,3, m hashes will have been computed.

As an example, suppose a data unit requires 9 applications of $\mathcal{H}$. Then $m=9=1001_{bin}$. Then this data unit would be processed on the first SIMD instruction (applying $b=2^0=1$ hash), then not be processed in the second and third instructions, but on the fourth SIMD instruction processing resumes (applying $b=2^3=8$ hashes).

Note that in the counter method, that for $\ell$ hash chains $\ell/k$ SIMD instructions are needed with each taking max (chain length)×(cycles for $\mathcal{H}$). This method has the added benefit that because on average half of the values of $m_i=0$, for $\ell$ hash chains $\ell/k$ SIMD instructions (doubling) are necessary, but these only take $2^i\times$(cycles for $\mathcal{H}$). In some situations this will be faster.

The processor 315 that implements the hash functions 300$_1$ to 300$_p$ may be implemented in different ways. The processor 315 may be implemented on a single integrated circuit. The hash functions 300$_1$ to 300$_p$ may be implemented using optimized software on one or more processing cores. In another embodiment, the hash functions 300$_1$ to 300$_p$ may be implemented using a cryptographic processor or accelerator. Further, the hash functions 300$_1$ to 300$_p$ may be implemented using a specific gate layout and design for this purpose on an integrated circuit or as part of a general purpose processor. In the case of a general purpose processor, the hash function capability may be accessed using an extended instruction. In any of these various implementations, the data unit(s) 320 may also be part of the processor or integrated circuit in order to decrease latency in storing and accessing the data during the computation of the chained hash functions. In other embodiments, the data unit(s) 320 may be outside the processor, but connected with the highest speed bus as possible in order to reduce the latency in the processing of the chained hash functions.

The processor 315 may be any hardware device capable of executing instructions. As such, the processor 315 may include a microprocessor, microcontroller, graphics processing unit (GPU), field programmable gate array (FPGA), application-specific integrated circuit (ASIC), machine learning optimized processor, or other similar devices.

As used herein, the term "non-transitory machine-readable storage medium" will be understood to exclude a transitory propagation signal but to include all forms of volatile and non-volatile memory. When software is implemented on a processor, the combination of software and processor becomes a single specific machine. Although the various embodiments have been described in detail, it should be understood that the invention is capable of other embodiments and its details are capable of modifications in various obvious respects.

Because the data processing implementing the present invention is, for the most part, composed of electronic components and circuits known to those skilled in the art, circuit details will not be explained in any greater extent than that considered necessary as illustrated above, for the understanding and appreciation of the underlying concepts of the present invention and in order not to obfuscate or distract from the teachings of the present invention.

Although the invention is described herein with reference to specific embodiments, various modifications and changes can be made without departing from the scope of the present invention as set forth in the claims below. Accordingly, the specification and figures are to be regarded in an illustrative rather than a restrictive sense, and all such modifications are intended to be included within the scope of the present invention. Any benefits, advantages, or solutions to problems that are described herein with regard to specific embodiments are not intended to be construed as a critical, required, or essential feature or element of any or all the claims.

Furthermore, the terms "a" or "an," as used herein, are defined as one or more than one. Also, the use of introductory phrases such as "at least one" and "one or more" in the claims should not be construed to imply that the introduction of another claim element by the indefinite articles "a" or "an" limits any particular claim containing such introduced claim element to inventions containing only one such element, even when the same claim includes the introductory phrases "one or more" or "at least one" and indefinite articles such as "a" or "an." The same holds true for the use of definite articles.

Unless stated otherwise, terms such as "first" and "second" are used to arbitrarily distinguish between the elements such terms describe. Thus, these terms are not necessarily intended to indicate temporal or other prioritization of such elements.

Any combination of specific software running on a processor to implement the embodiments of the invention, constitute a specific dedicated machine.

It should be appreciated by those skilled in the art that any block diagrams herein represent conceptual views of illustrative circuitry embodying the principles of the invention.

What is claimed is:

1. A hardware device configured to compute a plurality of chained hash functions in parallel, comprising:
   a processor implementing p hash functions configured to operate on a small input, where p is an integer;
   a data unit connected to the p hash functions, configured to store the outputs of the p hash functions that are then used as an input to a next round of computing the hash function,
   wherein the processor receives a single instruction and p small data inputs, and
   wherein each of the p hash functions are used to perform a chained hash function operation on a respective small input of the p small data inputs; and
   a counter corresponding to each of the p small data inputs, wherein the counter is updated each time a hash computation is performed, the counter having a count limit indicating how many hash computations are remaining to be performed,
   wherein a hash of a small data input is output when the counter is within the count limit, and
   wherein the small data input to a hash function is output when the counter is outside the counter limit.

2. The hardware device of claim 1, wherein the small input has a size of less than or equal to four times the block size of the p hash functions.

3. The hardware device of claim 1, wherein the small input has a size of less than or equal to two times the block size of the p hash functions.

4. The hardware device of claim 1, wherein the small input has a size of less than or equal to the block size of the p hash functions.

5. The hardware device of claim 1, wherein the processor implementing p hash functions is optimized to process the small input.

6. The hardware device of claim 1, wherein the hardware device is an integrated circuit.

7. The hardware device of claim 1, wherein the processor implementing p hash functions is a crypto processor.

8. The hardware device of claim 1, wherein the data unit includes a plurality of data units, wherein each of the plurality of data units is associated with one or more of the p hash functions.

9. The hardware device of claim 1, wherein the data unit includes a plurality of p data units, wherein each of the plurality of data units is associated with one of the p hash functions.

10. A method of computing a plurality of chained hash functions in parallel, comprising:
   receiving a single instruction and a plurality of small data inputs, wherein the single instruction instructs a processor to perform a parallel chained hash operation on the plurality of small data inputs;
   for each of the small data inputs in parallel, computing a chained hash function on the small data inputs, wherein the chained hash function includes a plurality of rounds:
      applying a hash function to each of the small data inputs in a first round to produce an output;
      applying the hash function to the output of a previous round in the second to last round,
      updating a counter corresponding to each of the small data inputs each time a hash computation is performed, the counter having a counter limit indicating how many hash computations are left to be performed;
      outputting the hash of a small data input using the hash function when the counter of a small data input is within the counter limit; and
      outputting the small data input to the hash function when the counter of the small data input is outside the counter limit.

11. The method of claim 10, wherein computing the chained hash function includes performing m chained hash operations on the small data inputs further includes:
   determining a split of m into sub-counters that are a power of 2,
   determining which of the m sub-counters hash operations should be performed,
   repeating for all sub-counters:
      performing $2^{sub\text{-}counter}$ chained hash operations on the small data inputs,
      outputting the of the data inputs.

12. The method of claim 10, wherein the small data input has a size of less than or equal to four times the block size of the hash functions.

13. The method of claim 10, wherein the small data input has a size of less than or equal to two times the block size of the hash functions.

14. The method of claim 10, wherein the small data input has a size of less than or equal to the block size of the hash functions.

15. The method of claim 10, wherein the hash functions are optimized to process the small data input.

16. The method of claim 10, wherein
   computing a chained hash function on the small data inputs further comprises writing the small data inputs into a dedicated data unit associated with processor,
   applying the hash functions to each of the small data inputs in a first round to produce an output further comprising reading the small data from a data unit in the processor and writing the output to the data unit, and
   applying the hash functions to the output of a previous round in the second to last round further comprising reading the output from the previous round and writing the output to the data unit.

* * * * *